United States Patent
Zhu et al.

(10) Patent No.: US 8,477,797 B2
(45) Date of Patent: Jul. 2, 2013

(54) METHOD AND APPARATUS FOR PROCESSING MEDIA STREAM QUEUES BASED ON CONTROL

(75) Inventors: Lei Zhu, Shenzhen (CN); Long Luo, Shenzhen (CN); Liming Zhang, Shenzhen (CN); Aiqin Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 560 days.

(21) Appl. No.: 12/237,092

(22) Filed: Sep. 24, 2008

(65) Prior Publication Data

US 2009/0022072 A1 Jan. 22, 2009

Related U.S. Application Data

(63) Continuation of application No. PCT/CN2007/000936, filed on Mar. 22, 2007.

(30) Foreign Application Priority Data

Mar. 27, 2006 (CN) .......................... 2006 1 0034736

(51) Int. Cl.
*H04Q 3/64* (2006.01)
*H04L 12/56* (2006.01)

(52) U.S. Cl.
USPC .......................................... 370/412; 370/260

(58) Field of Classification Search
USPC ............ 370/260, 312, 412; 455/518; 709/229
See application file for complete search history.

(56) References Cited

U.S. PATENT DOCUMENTS

| | | | |
|---|---|---|---|
| 5,870,629 A * | 2/1999 | Borden et al. .................. | 710/44 |
| 6,980,793 B2 | 12/2005 | Lee | |
| 7,561,892 B2 * | 7/2009 | Huh et al. ..................... | 455/416 |
| 7,593,359 B2 * | 9/2009 | Eneroth et al. ................ | 370/312 |
| 2003/0078064 A1 * | 4/2003 | Chan ............................. | 455/514 |
| 2004/0076143 A1 | 4/2004 | Lee | |
| 2005/0089152 A1 | 4/2005 | Han | |
| 2006/0056440 A1 * | 3/2006 | Khartabil ...................... | 370/447 |
| 2006/0089998 A1 * | 4/2006 | Kim et al. ..................... | 709/229 |
| 2006/0172754 A1 * | 8/2006 | Shin et al. ..................... | 455/518 |
| 2007/0133435 A1 * | 6/2007 | Eneroth et al. ................ | 370/260 |

FOREIGN PATENT DOCUMENTS

| | | |
|---|---|---|
| CN | 1309861 A | 8/2001 |
| CN | 1492645 A | 4/2004 |
| CN | 1588873 A | 3/2005 |
| CN | 1610433 A | 4/2005 |

(Continued)

OTHER PUBLICATIONS

Dommel, Hans-Peter, et al., "Floor Control for Multimedia Conferencing and Collaboration." Multimedia Systems. vol. 5, No. 1 (1997): pp. 23-38.*

(Continued)

*Primary Examiner* — Marsha D Banks Harold
*Assistant Examiner* — Matthew Campbell
(74) *Attorney, Agent, or Firm* — Slater & Matsil, L.L.P.

(57) ABSTRACT

A control-based method for processing media stream queues includes: a multimedia control entity processes the talk burst request queues corresponding to different media types when the conditions of triggering processing of different talk bursts are satisfied; and the multimedia control entity sends the assigned talk burst to the corresponding multimedia session terminal. The present invention also provides a corresponding apparatus. By processing the media stream queues, the present invention ensures talk bursts of multiple correlated media types to be assigned in a session.

11 Claims, 3 Drawing Sheets

FOREIGN PATENT DOCUMENTS

| | | |
|---|---|---|
| CN | 1611086 | 4/2005 |
| CN | 1620046 | 5/2005 |
| CN | 1674688 A | 9/2005 |
| WO | 9965214 A1 | 12/1999 |
| WO | WO-2005043944 | 5/2005 |

OTHER PUBLICATIONS

Dommel et al., "Floor control for multimedia conferencing and collaboration," Multimedia Systems, 1997, vol. 5, pp. 23-38.*

International Search Report, International application No. PCT/CN2007/000936, Date of mailing of the international search report Jul. 5, 2007, 4 pages.

English translation of Written Opinion of the International Searching Authority, International application No. PCT/CN2007/000936, Date of mailing Jul. 5, 2007, 3 pages.

Chinese Office Action, CN Application No. 200610034736.6, dated May 11, 2011, 8 pages.

OMA-TS-PoC-System-Description-V2_0-20060322-D, "OMA PoC System Description," Draft Version 2.0, dated Mar. 22, 2006, 205 pages.

Decision of Rejection, Application No. 2006100347366, Applicant: Huawei Technologies, Mar. 27, 2006, 12 pages.

* cited by examiner

METHOD AND APPARATUS FOR PROCESSING MEDIA STREAM QUEUES BASED ON CONTROL

This application is a continuation of International Patent Application Number PCT/CN2007/000936, filed Mar. 22, 2007, which claims the benefit of Chinese Patent Application No. 200610034736.6, filed with the Chinese Patent Office on Mar. 27, 2006, entitled "Method for Processing Media Stream Queues Based on Control", both of which are incorporated herein by reference in their entireties.

FIELD OF THE INVENTION

The present invention relates to the communication technology field, and in particular, to a method and an apparatus for processing media stream queues based on control in the multi-party service.

BACKGROUND

With the development of broadband networks, mobile communication covers more than the traditional voice communication, and provides multimedia services that combine audio, video, images and texts. By integrating the data services such as the presence service, Short Message Service (SMS), web browse, positioning information, Push service, and file sharing, the operator can meet diversified requirements of the user. Impelled by multiple applications, the 3GPP launches an IP-based Multimedia Subsystem (IMS) architecture, which implements miscellaneous multimedia applications and provides more choices and richer experience for users.

The multi-party service is a service form based on the IMS architecture. For example, the multi-party service can be implemented on a Push to Talk over Cellular (PoC) system or a conference system. The PoC system is a multi-party multimedia communication system under centralized control. The PoC service adopts the half-duplex communication mode, implements point-to-point or point-to-multipoint voice communication, and enables only one participant to speak at a time to facilitate group communication. Once pressing a key, the calling party can originate a conversation with a person or a group, without dialing a number or waiting for the opposite party to go off-hook. The call is put through promptly, and a conversation group is set up quickly. The conference service is a web-based telephone service oriented to different types of web conferences. A user may attend a web conference through a soft terminal, an ordinary telephone set, or a Session Initiation Protocol (SIP) hard terminal and a Mobile Station (MS). The chairman of the conference reserves a conference through web pages and manages the conference in real time. The attendees view the conference information through web pages. An attendee may attend a conference in either convergent or diffusive way. A conference member may originate a subconference during a conference. A subconference enables the attendees to discuss in groups. A request of originating a subconference is submitted to the conference chairman through web pages. After being approved by the chairman, the subconference is put through.

In a multi-party service, the media sending right ("talk burst") of members should be managed because only one user is allowed to speak at a time. In a communication system based on media stream/media stream control, for example, in a PoC system or a web conference system, different types of media streams are distributed and controlled on the multimedia control entity that controls the session, including negotiation and acquisition of the talk burst. For example, after a session is established in a PoC system, a user may apply for the talk burst (also known as "speaking right") on the multimedia session terminal (PoC terminal) in the process hereinafter.

First, the multimedia session terminal applies for the talk burst from the multimedia control entity (for example, PoC server) through a "Talk Burst Request" message based on the Talk Burst Control Protocol (TBCP); the PoC server returns a "Talk Burst Granted" message to the applicant, telling the applicant that he/she is allowed to speak; meanwhile, the PoC server sends a "Talk Burst Taken" message to other users, notifying other members of the group of the information about the current speaker. The multimedia session terminal that obtains the talk burst begins to speak (namely, send media streams). The media streams are forwarded by the PoC server to other members in the group. Upon completion of speaking, the multimedia session terminal releases the talk burst. When the talk burst of the group is idle, the PoC server broadcasts a "Floor Control Idle" message to the group members. The PoC system under the prior art supports the "Talk Burst Request Queue" function. Namely, when more than one multimedia session terminal applies for the talk burst, the PoC server performs arbitration, approves only one of the applicants to hold the talk burst, and refuses the requests from other applicants or inserts the requests into a Talk Burst Request Queue. After the current speaker releases the talk burst, the PoC server selects a requester from the queue according to a certain policy (for example, by priority) and grants the talk burst to him/her.

Figure 1:
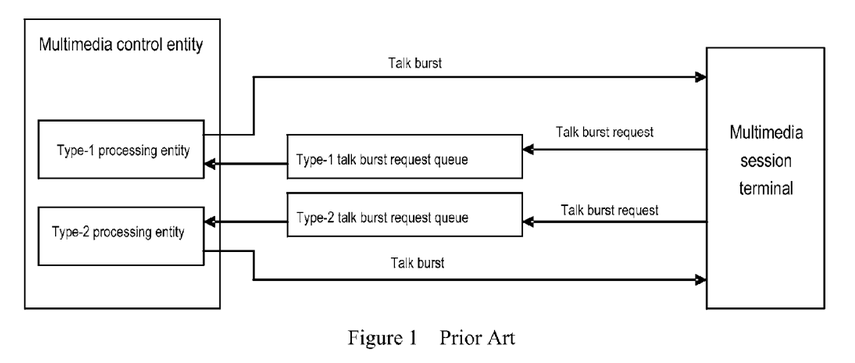
FIG. 1 shows how a multimedia processing entity processes a multimedia stream request under the prior art.

FIG. 1 shows how a multimedia processing entity processes a multimedia stream request under the prior art. In the figure, different types of media streams are divided into processing entities of several media types on a multimedia control entity (for example, SIP server). Each media type is controlled and processed by the processing entity of this media type. FIG. 1 shows two types of processing entity: type 1, and type 2. In the prior art, the processing entities of multiple media types serve as logic entities, and are not associated with each other.

Due to existence of the talk burst request queue, before processing the requests of talk bursts of a media type, it is necessary to wait in the talk burst request queue of the specific media type until the request of talk bursts is processed by the entity in charge of processing the requests of talk bursts.

Under the prior art, multiple media types or a combination of multiple media types is used to negotiate and control one or more types of media streams, and the control entities work independently of each other, which tends to cause conflict between media types in a multimedia environment. For example, a multimedia user (multimedia session terminal) may apply for a media processing entity that handles voice streams and another media processing entity that handles the video streams mixed with voice ("audio and video streams"). In a multi-party service environment, every user in the session may use a media processing entity of voice streams and a media processing entity of audio and video streams to apply for the talk burst streams.

From the perspective of the media sender: In a voice session, if an audio and video session exists, one multimedia session terminal may obtain two talk bursts. In this case, the talk bursts are independent between different media types, and two voice controls are independent of each other. If multiple voices are sent by a terminal at a time, the PoC session will be chaotic and the user experience will be poor.

Moreover, while a multimedia session terminal obtains the right of sending ordinary voice sessions and is under a voice session, if another multimedia session terminal obtains the right of sending audio and video sessions, namely, both of the two multimedia session terminals hold the voice-related talk bursts, when the two terminals send voice simultaneously, other users in the session will hear the voice from two multimedia session terminals at a time. This leads to poor user experience in the session. As for the two multimedia session terminals, while they are speaking, they hear the voice from opposite multimedia session terminal, session. The concurrence of multiple voices in one session is not allowed in many scenarios, and conflicts with the habit of the multimedia multi-party service.

Therefore, multiple control entities that handle multimedia streams working independently may lead to conflict, namely, multiple voices occur in one session, and the control entity that controls voice streams is unable to control the work of other control entities allowed to send voice streams.

SUMMARY

The embodiments of the present invention provide a method and an apparatus for processing media stream queues based on control, improve the talk burst waiting queues, and overcome the conflict between multiple media types effectively.

A control-based method for processing media stream queues provided in an embodiment of the present invention includes: processing the talk burst request queues corresponding to different media types upon receiving a trigger message of processing different talk bursts through a multimedia control entity; and sending an assigned talk burst to the corresponding multimedia session terminal.

A control-based apparatus for processing media stream queues provided in an embodiment of the present invention includes: a receiving unit, adapted to receive a trigger message of processing different talk bursts; a processing unit, adapted to process talk burst request queues corresponding to different media types according to the trigger message received by the receiving unit, and assign a talk burst; and a sending unit, adapted to send the assigned talk burst to the corresponding multimedia session terminal.

Preferably, the trigger message is a processing indication sent from the multimedia session terminal or the network entity; or a preset message sent from the multimedia session terminal, network entity or operator; or a session message.

In the control-based method for processing media stream queues under the present invention, the multimedia control entity is a PoC server, SIP server, conference server, IP-based instant messaging server, Multimedia Source Function (MRF), multimedia gateway, or a specific terminal in the session.

In the technical solution provided in embodiment of the present invention, the entities of controlling media streams and the entities of controlling the talk burst of independent media types are interrelated in a certain way (combining or splitting). A queue mechanism is used in the present invention to enable the talk burst requests in different queues to wait correlatively. After a request of talk burst is approved, the talk bursts of the correlated media type wait in a queue to ensure that only one type of media streams occurs in a session at a time.

DETAILED DESCRIPTION

The present invention provides a method for processing the queues supported by a multimedia control entity.

First, a multimedia session is set up. In this process, the multimedia session terminals (for example, PoC client or other clients) need to negotiate with the multimedia entities (for example, PoC server, briefly known as "multimedia control entity") that control the session with respect to the media type and the media parameters applied to this session. Under the prior art, for each uncorrelated media type, a media stream processing entity (as shown in FIG. 1) of such a media type is negotiated out on the multimedia control entity. The media types may be combined randomly. The process of setting up a session is not elaborated here, and the information about negotiation between different media stream processing entities is easily accessible in other relevant technical documents.

Upon completion of negotiation, the multimedia session terminal in this session may apply for a type of talk burst ("speaking right") to the multimedia control entity. In this case, if this type of talk burst is idle, the multimedia control entity approves the multimedia session terminal to send the media stream. The multimedia control entity forwards the media stream from the session terminal to other members of the group. Once the multimedia session terminal finishes speaking, it releases the talk burst. At this time, if this type of talk burst is seized by other multimedia session terminals, the multimedia control entity puts the sending request of the multimedia session terminal into a corresponding talk burst request queue. After the current speaker releases the talk burst, the multimedia control entity selects a requester from the queue according to a certain policy (for example, by priority), and grants the talk burst to him/her.

In the present invention, the talk burst request queues corresponding to different media types can be processed according to a preset policy. Generally, the entity for processing talk burst request queues is a network entity that controls the session, for example, PoC server, SIP server, conference server, IP-based instant messaging server, Convergence IP Message (CPM) server, Multimedia Source Function (MRF), multimedia gateway; or, in some circumstances, a special terminal in the session. They are collectively known as talk burst control entities.

Before the talk burst control entity processes the talk burst request queue, the terminal or the network may instruct the talk burst control entity to process the talk burst request queue. The terminal that sends the instruction may be a terminal authorized and licensed by the network. The network that sends the instruction may be the talk burst control entity itself, or other network entity in the network.

After the talk burst control entity processes the talk burst request queue, the multimedia session terminal in the session may be notified of the processing performed by the talk burst control entity; or may be notified of the current state of queue processing.

The processing of multiple queues mentioned above includes: combining multiple talk burst request queues of different media types into one talk burst request queue, or splitting a combined queue back to multiple talk burst request queues.

In the present invention, the processing of multiple queues may be performed before the multimedia control entity assigns a talk burst. In this case, different talk burst request queues may be processed, including: combining multiple talk burst request queues corresponding to different media types, or splitting a combined queue back to multiple queues. Combining of multiple talk burst request queues is equivalent to correlating multiple media types (for example, several continuous media stream types) on a multimedia control entity and processing them through the same queue. Combining talk burst waiting queues of several media types may be a default mode of setting the talk burst queues of a multimedia session.

In the present invention, the processing of multiple queues may be performed after the multimedia control entity assigns a talk burst. In this case, multiple media types correspond to multiple multimedia processing entities, and a new waiting queue (hereinafter referred to as "talk burst waiting queue") needs to be configured. This waiting queue correlates the talk burst requests of different media types. If the talk burst request of the correlated media type obtains a talk burst from the multimedia control entity, the talk burst request will be put into the newly assigned waiting queue, waiting for the talk burst to be sent to the corresponding multimedia session terminal.

The technical solution under the present invention is hereinafter described in detail with reference to the embodiments and accompanying drawings.

Figure 2:
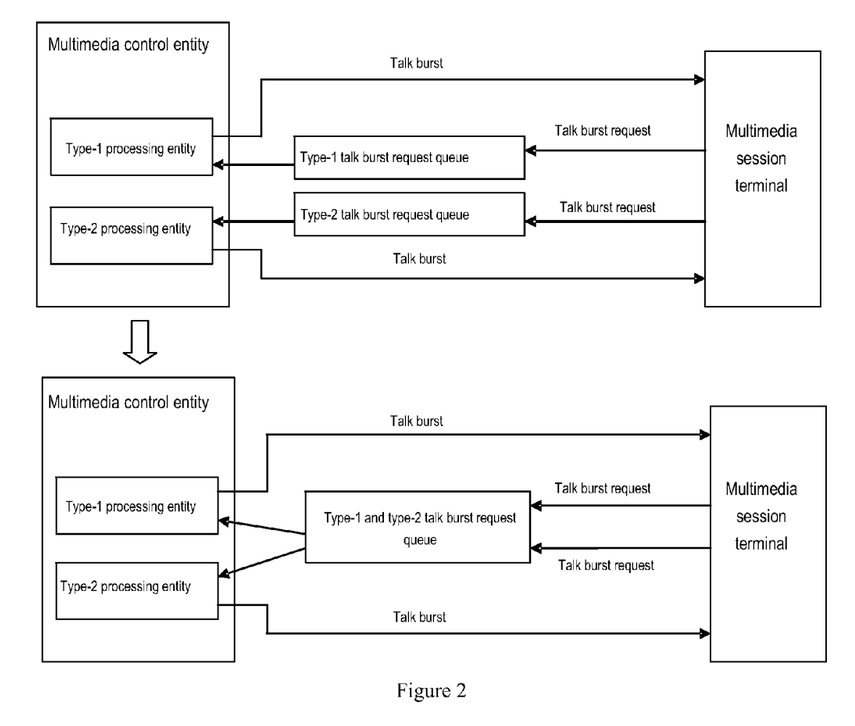
FIG. 2 shows the processing procedure of a multimedia control entity in the first embodiment of the present invention.

FIG. 2 shows the processing procedure of a multimedia control entity in the first embodiment of the present invention.

When a multimedia session terminal requests the multimedia control entity for a talk burst of a media type, the multimedia control entity will configure a talk burst request queue for the talk burst request to be processed. Each different media type corresponds to a different talk burst request queue. The talk burst requests of a media type are in the corresponding talk burst request queue, waiting for being processed. Therefore, when a multimedia control entity handles talk burst requests, corresponding talk burst request queues of multiple media types need to be handled.

FIG. 2 shows a type-1 (for example, voice stream) talk burst request queue and a type-2 (for example, video stream) talk burst request queue. For example, when a multimedia session terminal sends a voice stream burst request to the multimedia control entity, if the voice stream processing entity in the multimedia control entity is handling another voice stream burst request, namely, the current voice stream burst is seized, the current voice stream burst request will be put into a proper position in a voice stream burst request queue to wait, where the proper position is determined according to a policy (for example, by priority). For example, when a multimedia session terminal sends a video stream burst request to the multimedia control entity, if the video stream processing entity in the multimedia control entity is handling another video stream burst request, namely, the current video stream burst is seized, the current video stream burst request will be put into a proper position in a video stream burst request queue to wait, where the proper position is determined according to a policy (for example, by priority).

In this case, under the embodiments of the present invention, the multimedia control entity may combine the talk burst request queues of multiple media types. The conditions of triggering combination of talk burst request queues include: indication from a multimedia session terminal, preset local policy in a network, or rules of the currently controlled session. According to the foregoing triggering conditions, the multimedia control entity may combine a type-1 (voice stream) talk burst request queue with a type-2 (video stream) talk burst request queue into a talk burst request queue commonly used by type-1 streams and type-2 streams. FIG. 2 shows an example of combined queues—type-1 and type-2 talk burst request queue.

An indication from a multimedia session terminal may be: a specific indication sent by an authorized multimedia session terminal to require the multimedia entity to combine multiple types of talk burst request queues. After receiving the indication, the multimedia control entity combines the talk burst request queues of the specified media streams. For example, at the stage of setting up or performing a session, the multimedia session terminal or the network entity may send a processing indication to the network control entity. The processing indication obtained from a network entity at the stage of setting up a session may be a group message of setting up a multi-party conversation.

Local policy in a network means: The multimedia control entity enables the network or the operator to control media streams in a session by controlling the media streams according to the policy (namely, preset information) of the user, network or operator. If the local policy implemented by the multimedia control entity is to combine talk burst request queues of several media stream types under certain conditions, the multimedia control entity will combine the talk burst request queues of the specified media stream types according to the policy when the conditions are met. For the operation of combination, the default mode may not necessarily be: every media type corresponds to a talk burst request queue of an independent media type, but may be combined talk burst waiting queues of several media types. In other words, when a multimedia session is set up, talk burst requests of multiple correlated media types use the same talk burst waiting queue according to the policy. The rules of the currently controlled session come from the information about the current session. For example, when a multi-party conversation is set up, the multimedia control entity obtains the mode of processing the session from the database that contains the subscription data of the multimedia session terminal (for example, the group database or server that contains the multimedia session group information). Namely, the multimedia control entity may know whether to correlate multiple media types at the beginning of the session. The session processing modes include correlated mode and independent mode. The correlated mode means combining of talk burst request queues of multiple media types; and the independent mode means the talk burst request queues of multiple media types correspond to the media processing entity respectively and work independently. The multimedia session group information is the information stored in the XDM server; and the server is an application server, a PoC server or conference server, an IP-based instant messaging server, a Multimedia Resource Function (MRF) or a multimedia gateway. For example, when a multi-party conversation is set up, the multimedia control entity can know whether the correlated mode or the independent mode is employed between type 1 and type 2. If the correlated mode is employed, the multimedia control entity may combine the correlated talk burst request queues of multiple stream types.

Figure 3:
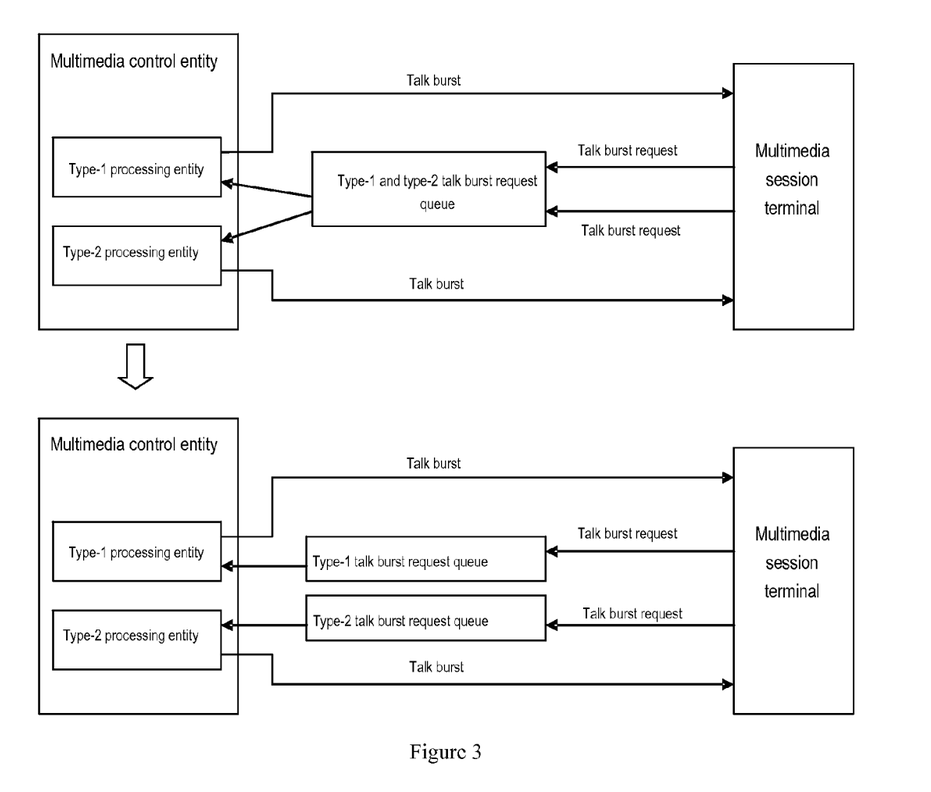
FIG. 3 shows the processing procedure of a multimedia control entity in the second embodiment of the present invention.

FIG. 3 shows the processing procedure of a multimedia control entity in the second embodiment of the present invention.

When a multimedia session terminal requests the multimedia control entity for a talk burst of a media type, the multimedia control entity will configure a talk burst request queue for the talk burst request to be processed. Each different media type corresponds to a different talk burst request queue. The talk burst requests of a media type are in the corresponding talk burst request queue, waiting for being processed. When the talk burst request queues of several media stream types are combined (see the description in FIG. 2), the talk burst requests of several media types are put into a combined talk burst request queue, waiting for being processed. For example, type-1 talk burst requests and type-2 talk burst requests are put into the type-1 and type-2 talk burst request queue, waiting for being processed. When the client sends a voice stream burst request to the multimedia control entity, if the voice stream processing entity or the video stream processing entity is processing another burst request, the current burst request needs to be put into the voice stream and video stream burst request queue (type-1 and type-2 talk burst request queue), waiting for being processed. When the client sends a video talk burst request to the multimedia control entity, if the voice stream processing entity or the video stream processing entity is processing another video stream burst request, the current video stream burst request needs to be put into the voice stream and video stream burst request queue (type-1 and type-2 burst request queue), waiting for being processed.

In this case, the multimedia control entity may split the talk burst request queue of multiple media types into different talk burst request queues of different media types. The conditions of triggering splitting of talk burst request queues include: indication from a multimedia session terminal, preset local policy in a network, or rules of the currently controlled session.

An indication from a multimedia session terminal may be: a specific indication sent by an authorized multimedia session terminal to require the multimedia entity to handle different types of talk burst requests separately. After receiving the indication, the multimedia control entity handles the talk burst requests of the media streams in a combination separately according to the media type. For example, at the stage of setting up or performing a session, the multimedia session terminal or the network entity may send a processing indication to the network control entity. The processing indication obtained from a network entity at the stage of setting up a session may be a group message of setting up a multi-party conversation.

Local policy in a network means: The multimedia control entity enables the network or the operator to control media streams in a session by controlling the media streams according to the policy (namely, preset information) of the user, network or operator. If the local policy implemented by the multimedia control entity is to handle talk burst request queues of several media stream types separately under certain conditions, the multimedia control entity will handle the talk burst request queues of different media stream types separately according to the policy when the conditions are met. The default mode may also be: every media type corresponds to a talk burst request queue of an independent stream type.

The rules of the currently controlled session come from the information about the current session. For example, when a multi-party conversation is set up, the multimedia control entity obtains the mode of processing the session from the database that contains the subscription data of the multimedia session terminal (for example, group database). Namely, the multimedia control entity may know whether to correlate multiple media types at the beginning of the session. For example, when a multi-party conversation is set up, the multimedia control entity can know whether the correlated mode or the independent mode is employed between type 1 and type 2. If the independent mode is employed, the multimedia control entity may split a combined talk burst request queue of multiple stream types.

Figure 4:
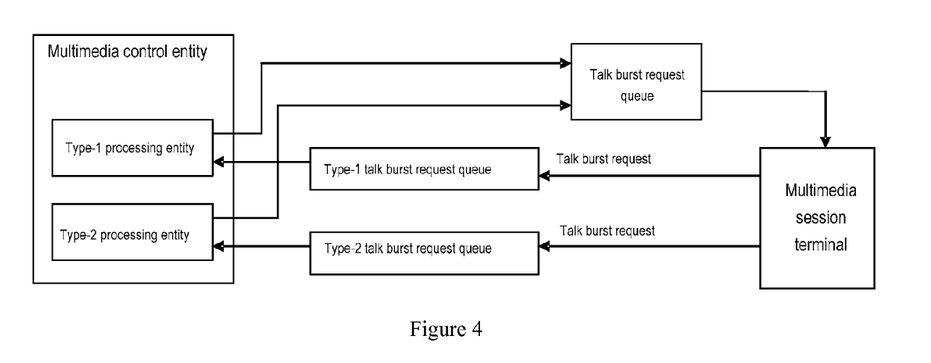
FIG. 4 shows the processing procedure of a multimedia control entity in the third embodiment of the present invention.

FIG. 4 shows the processing procedure of a multimedia control entity in the third embodiment of the present invention.

When a multimedia session terminal requests the multimedia control entity for a talk burst of a media type, the multimedia control entity will configure a talk burst request queue for the talk burst request to be processed. Different media types correspond to one talk burst request queue. The media stream control is independent between different media types. After the multimedia processing entity receives a talk burst request and grants a media stream sending license, a talk burst waiting queue may be configured between the interrelated media types. The talk burst waiting queue is responsible for ensuring that only one talk burst is sent to a User Equipment (UE) among the interrelated media types during the current session.

FIG. 4 shows a type-1 (for example, voice stream) talk burst request queue and a type-2 (for example, video stream) talk burst request queue. When a multimedia session terminal sends a voice stream burst request to the multimedia control entity, if the voice stream processing entity in the multimedia control entity is handling another voice stream burst request, the current voice stream burst request will be put into a proper position in a voice stream burst request queue to wait, where the proper position is determined according to a policy (for example, by priority). When a multimedia session terminal sends a video stream burst request to the multimedia control entity, if the video stream processing entity in the multimedia control entity is handling another video stream burst request, namely, the current video stream burst request will be put into a proper position in a video stream burst request queue to wait.

In this case, the multimedia control entity may assign a processed talk burst waiting queue according to a certain policy, for example, by priority. The conditions of triggering assigning of talk burst waiting queues include: indication from a multimedia session terminal, preset local policy in a network, or rules of the currently controlled session.

An indication from a multimedia session terminal may be: a specific indication sent by an authorized multimedia session terminal to require the multimedia entity to assign talk burst waiting queue.

Local policy in a network means: The multimedia control entity enables the network or the operator to control media streams in a session by controlling the media streams according to the policy (namely, preset information) of the user, network or operator. If the local policy implemented by the multimedia control entity is to configure a talk burst waiting queue under certain conditions, the multimedia control entity will configure a waiting queue for talk bursts of several stream types according to the policy when the conditions are met, or configure a talk burst waiting queue for one talk burst by default.

The rules of the currently controlled session come from the information about the current session. For example, when a multi-party conversation is set up, the multimedia control entity obtains the mode of processing the session from the database that contains the subscription data of the multimedia session terminal (for example, group database). Namely, the multimedia control entity may know whether to correlate multiple media types at the beginning of the session. The multimedia control entity judges whether it is necessary to configure a talk burst waiting queue. If necessary, the multimedia control entity may put the sending licenses of different media types into the talk burst waiting queue in a multi-party service.

It should be understood that the processing of talk burst request queues of multiple types performed by the multimedia control entity may be decided at the session setup stage according to a policy. The policy here means: The processing of the talk burst request queue may be decided according to the session setup information, or the group information of the session to be set up, or the policy of the operator.

If the processing of the talk burst request queue is decided at the session setup stage, the state of processing the talk burst request queue may be notified to the multimedia session terminal involved in the session.

The processing of talk burst request queues of multiple types may be performed by the multimedia control entity in the process of a session, or performed according to the processing indication sent by the multimedia session terminal. If the processing of the talk burst request queue is in the process of a session, the multimedia session terminal involved in the session may be notified of the state of processing the talk burst request queue.

The state of processing the talk burst request queue may be notified to the multimedia session terminals involved in the session through these mechanisms: multimedia session control-plane mechanism and message, for example Subscribe/Notify mechanism; multimedia session user-plane mechanism and message, for example, a media stream control message such as Talk Burst Control Protocol (TBCP) and Media Burst Control Protocol (MBCP) specified in the PoC service specifications.

Figure 5:
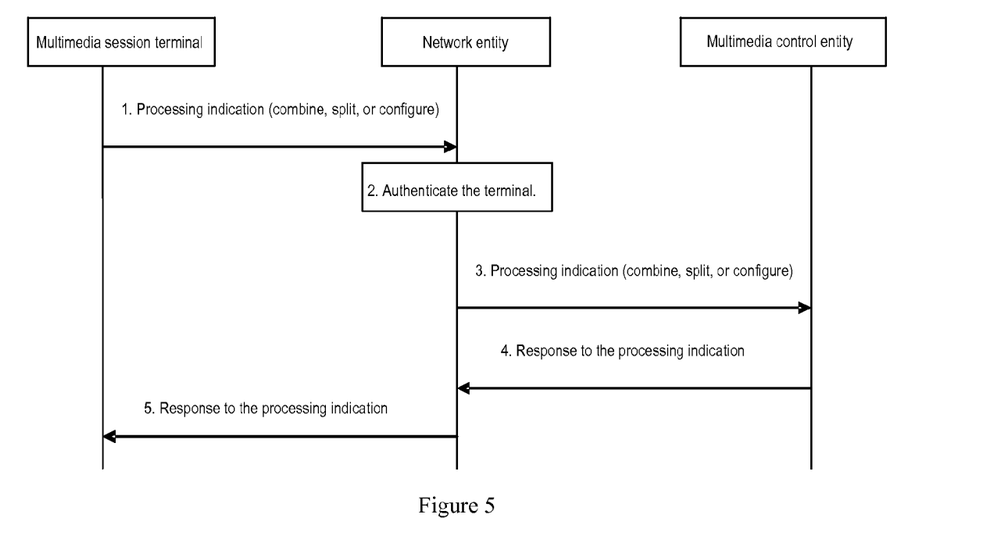
FIG. 5 is a flowchart in which a UE instructs the multimedia processing entity to perform processing in an embodiment of the present invention.

FIG. 5 is a flowchart in which a UE instructs the multimedia processing entity to perform processing in an embodiment of the present invention. First, the multimedia session terminal sends a processing indication, indicating the processing mode to the multimedia control entity. The processing mode may be: The multimedia control entity combines talk burst request queues, splits a talk burst request queue, or configures a talk burst request queue. The processing indication is carried in a Re-INVITE message, an UPDATE message, a user-plane message (TBCP/MBCP message), an INFO message, or a REFER message.

The network entity authenticates the multimedia session terminal that sends the processing indication by invoking the subscription data of the multimedia session terminal stored in the group database. If the subscription data proves that the multimedia session terminal subscribes to the service, the authentication succeeds, and the network entity will send the processing indication to the multimedia control entity; otherwise, the network entity will reject the processing indication.

The network entity sends a processing indication to the multimedia control entity. According to the processing indication, the multimedia control entity processes the queues of multiple media types (for example, combines talk burst request queues, splits a talk burst request queue, sets a talk burst request queue).

After processing the queues according to the received processing indication, the multimedia control entity returns a response message to the network entity. A response message may be a 200 OK message, or a user-plane message (TBCP or MBCP message).

The network entity forwards the response message from the multimedia control entity to the multimedia session terminal. The response message may be sent to the multimedia session terminal while the network entity sends a processing indication to the multimedia control entity.

The message control entity may serve as part of the network entity, or deployed independently in the network as shown in FIG. 5.

A control-based apparatus for processing media stream queues provided in an embodiment of the present invention includes: a receiving unit, adapted to receive a trigger message of processing different talk bursts; a processing unit, adapted to process talk burst request queues corresponding to different media types according to the trigger message received by the receiving unit, and assign a talk burst; and a sending unit, adapted to send the assigned talk burst to the corresponding multimedia session terminal.

The trigger message is a processing indication sent from the multimedia session terminal or the network entity; or a preset message sent from the multimedia session terminal, network entity or operator; or a session message.

In the embodiment of the present invention, the entities of controlling media streams and the entities of controlling the talk burst of independent media types are interrelated in a certain way (combining or splitting). A queue mechanism is used in the present invention to enable the talk burst requests in different queues to wait correlatively. After a request of talk burst is approved, the talk bursts of the correlated media type wait in a queue to ensure that talk bursts of multiple correlated media types are assigned in a session and only one type of media streams occurs in a session at a time.

Although detailed description is made for the exemplary embodiments of this invention to describe rather than restrict the technical solution of the present invention, it is to be understood that those skilled in the field can make various modifications and equivalent substitutions to this invention without departing from the spirit and scope of this invention. The scope of the present invention intends to be defined by the accompanying claims.

What is claimed is:

1. A control-based method for processing media stream queues, the method comprising:

receiving, by a multimedia control entity, a first talk burst request corresponding to a first media type and a second talk burst request corresponding to a second media type, the first and send talk burst requests sent from a terminal, wherein the first media type is different with the second media type;

assigning, by the multimedia control entity, the first talk burst request to a first queue corresponding to the first media type, and the second talk burst request to a second queue corresponding to the second media type;

obtaining, by the multimedia control entity, an indication of combining the first queue corresponding to the first media type and the second queue corresponding to the second media type;

combining, by the multimedia control entity, the first queue and the second queue into a third queue according to the indication;

processing the first talk burst request and the second talk burst request in the third queue in sequence.

2. The method according to claim 1, wherein the processing the first talk burst request and the second talk burst request in the third queue in sequence comprises:

processing the first talk burst request corresponding to the first media type in the third queue;

determining whether the first talk burst request corresponding to the first media type is under processing, wherein if the first talk burst request is under processing, the second talk burst request corresponding to the second media type is maintained waiting in the third queue.

3. The method according to claim 1, wherein the obtaining an indication of combining comprises:
receiving the indication from the terminal or a network entity.

4. The method according to claim 1, wherein the obtaining an indication of combining comprises:
at the multimedia control entity, receiving the indication of combining from the terminal or the server when the first media type and the second media type are determined, by the terminal or a server for storing multimedia session group information, to be processed in a correlated mode in a current session.

5. The method according to claim 4, wherein the server for storing multimedia session group information comprises an application server, a Push to Talk over Cellular (PoC) server, a conference server, an IP-based instant messaging server, a Multimedia Source Function (MRF), or a multimedia gateway.

6. The method according to claim 1, further comprising: notifying a state of the processing the terminal.

7. The method according to claim 1, wherein the multimedia control entity is a PoC server, a Session Initiation Protocol (SIP) server, a conference server, an IP-based instant messaging server, a Multimedia Source Function (MRF), a multimedia gateway, or a specific terminal.

8. A control-based apparatus for processing media stream queues, wherein the control-based apparatus comprises:
a receiver configured to receive a first talk burst request from a terminal, the first talk burst request corresponding to a first media type and a second talk burst request corresponding to a second media type, wherein the first media type is different with the second media type;
a processor configured to assign the first talk burst request to a first queue corresponding to the first media type, and the second talk burst request to a second queue corresponding to the second media type;
wherein the receiver is further configured to obtain an indication of combining the first queue corresponding to the first media type and the second queue corresponding to the second media type, and
wherein the processor is further configured to combine the first queue and the second queue into a third queue according to the indication, and process the first talk burst request and the second talk burst request in the third queue in sequence.

9. The apparatus according to claim 8, wherein the processor is further configured to process the first talk burst request corresponding to the first media type in the third queue, and determine whether the first talk burst request corresponding to the first media type is under processing, wherein if the first talk burst request is under processing, the second talk burst request corresponding to the second media type is maintained waiting in the third queue.

10. The apparatus according to claim 8, wherein the receiver is further configured to receive the indication from the terminal or a network entity.

11. The apparatus according to claim 8, wherein the receiver is further configured to receive the indication of combining from the terminal or a server for storing multimedia session group information when the first media type and the second media type are determined, by the terminal or the server, to be processed in a correlated mode in a current session.

* * * * *